(12) United States Patent
Wilks et al.

(10) Patent No.: US 12,553,571 B2
(45) Date of Patent: Feb. 17, 2026

(54) DUAL GAS TRAILER WITH SLIDING PISTON

(71) Applicant: Caterpillar Inc., Peoria, IL (US)

(72) Inventors: Zachary J. Wilks, Spring, TX (US); Mitchel R. Deckard, Montgomery, TX (US)

(73) Assignee: Caterpillar Inc., Peoria, IL (US)

( * ) Notice: Subject to any disclaimer, the term of this patent is extended or adjusted under 35 U.S.C. 154(b) by 548 days.

(21) Appl. No.: 17/938,541

(22) Filed: Oct. 6, 2022

(65) Prior Publication Data

US 2024/0117928 A1  Apr. 11, 2024

(51) Int. Cl.
| | |
|---|---|
| *F17C 1/00* | (2006.01) |
| *B60P 3/22* | (2006.01) |
| *B60P 3/24* | (2006.01) |
| *F17C 5/00* | (2006.01) |
| *F17C 7/00* | (2006.01) |

(52) U.S. Cl.
CPC .............. *F17C 1/00* (2013.01); *B60P 3/2205* (2013.01); *B60P 3/2245* (2013.01); *B60P 3/225* (2013.01); *B60P 3/24* (2013.01); *F17C 5/00* (2013.01); *F17C 7/00* (2013.01); *B60P 3/228* (2013.01); *F17C 2201/0109* (2013.01); *F17C 2201/054* (2013.01); *F17C 2205/0103* (2013.01); *F17C 2205/0142* (2013.01); *F17C 2205/0332* (2013.01); *F17C 2221/013* (2013.01); *F17C 2221/033* (2013.01); *F17C 2250/03* (2013.01); *F17C 2250/043* (2013.01); *F17C 2250/0439* (2013.01); *F17C 2270/0171* (2013.01)

(58) Field of Classification Search
CPC .......... F17C 2201/019; F17C 2221/013; F17C 2223/0123; F17C 2270/0171
See application file for complete search history.

(56) References Cited

U.S. PATENT DOCUMENTS

| | | | |
|---|---|---|---|
| 5,603,360 A * | 2/1997 | Teel | F17C 9/00 137/267 |
| 9,682,344 B1 | 6/2017 | Hall et al. | |
| 10,280,882 B2 | 5/2019 | Hall et al. | |
| 2013/0306322 A1* | 11/2013 | Sanborn | E21B 43/2607 166/308.1 |
| 2023/0119956 A1* | 4/2023 | Thobe | B60P 3/225 141/9 |

FOREIGN PATENT DOCUMENTS

| | | |
|---|---|---|
| CN | 205326823 U | 6/2016 |
| EP | 3961084 A1 | 3/2022 |

* cited by examiner

Primary Examiner — Timothy P. Kelly

(57) ABSTRACT

In some implementations, a dual gas transport system includes a trailer, one or more tanks mounted on the trailer, wherein each of the one or more tanks includes a first compartment and a second compartment, the first and second compartments being separated from each other by a sliding piston, and an electronic control module configured to control operations of the one or more tanks.

19 Claims, 3 Drawing Sheets

DUAL GAS TRAILER WITH SLIDING PISTON

TECHNICAL FIELD

The present disclosure relates generally to a dual gas trailer and, for example, to tanks with a sliding piston.

BACKGROUND

Internal combustion engines (e.g., natural gas engines) consume fuel (e.g., natural gas) and emit carbon dioxide ($CO_2$). For engines equipped with $CO_2$ capture systems, there is a need for $CO_2$ transport to a remote sequestration site. Currently, transportation of natural gas and $CO_2$ requires separate infrastructure (e.g., tank trailers). Use of separate infrastructure, including devoting at least one leg of each round-trip journey to the return of empty tanks, is inefficient, time-consuming, and costly.

The apparatus of the present disclosure solves one or more of the problems set forth above and/or other problems in the art.

SUMMARY

In some implementations, a dual gas transport system includes a trailer; one or more tanks mounted on the trailer, wherein each of the one or more tanks includes a first compartment and a second compartment, the first and second compartments being separated from each other by a sliding piston; and an electronic control module configured to control operations of the one or more tanks.

In some implementations, a method of dual gas transport with a trailer having one or more tanks includes, sequentially, receiving natural gas, at a first site, into a first compartment of each of the one or more tanks; transporting the trailer from the first site to a second site; delivering the natural gas, at the second site, out of the first compartment of each of the one or more tanks; receiving CO2, at the second site, into a second compartment of each of the one or more tanks, the second compartment being separated from the first compartment by a sliding piston; transporting the trailer from the second site to a third site; and delivering the CO2, at the third site, out of the second compartment of each of the one or more tanks.

In some implementations, an electronic control module, configured to control operations of one or more tanks of a dual gas transport system, includes one or more memories; and one or more processors, configured to: control actuation of a first valve, in fluid communication with a first compartment of each of the one or more tanks, to receive natural gas, at a first site, into the first compartment; control actuation of the first valve to deliver the natural gas, at a second site, out of the first compartment of each of the one or more tanks; control actuation of a second valve, in fluid communication with a second compartment of each of the one or more tanks, to receive CO2, at the second site, into the second compartment, the second compartment being separated from the first compartment by a sliding piston; and control actuation of the second valve to deliver the CO2, at a third site, out of the second compartment of each of the one or more tanks.

DETAILED DESCRIPTION

This disclosure relates to a dual gas trailer, which is applicable to any process that consumes compressed gas (e.g., natural gas) and captures $CO_2$. The process may be performed at any location that is remote from the compressed gas source and/or the sequestration site. The term "remote" may refer to any off-site field location independent of travel distance. The term "process" may refer to an operation associated with an industry such as, for example, mining, construction, farming, transportation, or another industry. For example, the process may be associated with oil & gas (e.g., drilling and/or hydraulic fracturing), electric power generation, gas compression, turbines, steam methane reformers, heaters, mining, dryers (e.g., sand drying), agriculture, forestry, asphalt/concrete plants, marine, and/or other industries. The dual gas trailer solution, described herein, enables use of the same infrastructure for inbound and outbound trips, which drives efficiency, time savings, and cost savings.

Figure 1:
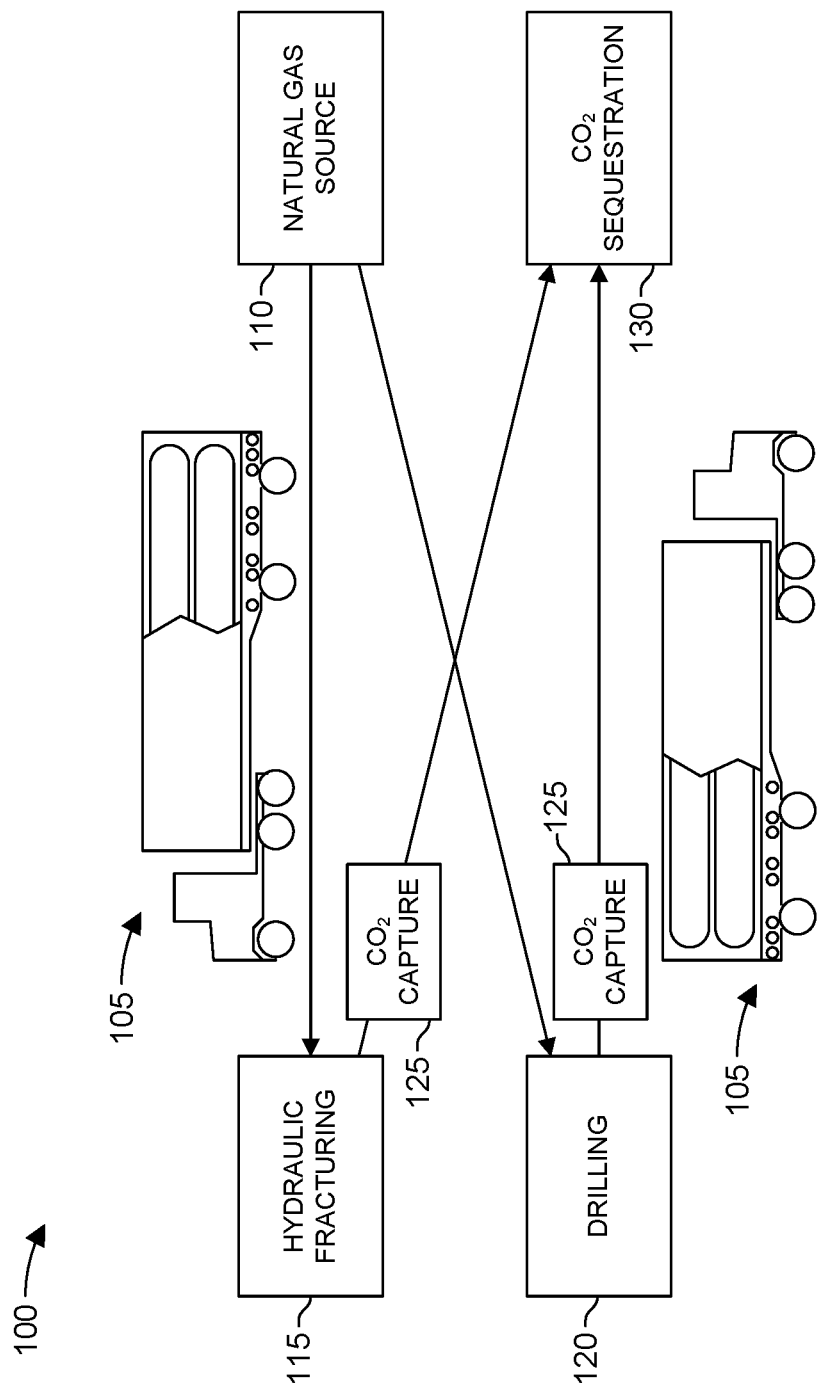
FIG. 1 is a diagram of an example implementation described herein.

FIG. 1 is a diagram of an example implementation 100 described herein. For example, FIG. 1 depicts a partial cutaway side view of a dual gas trailer 105. In some examples, the implementation 100 may include less equipment, additional equipment, or alternative equipment compared to the example depicted in FIG. 1. The dual gas trailer 105 may be pulled by a semi-truck. Alternatively, the dual gas trailer 105 may be moved by another mode of transport, such as a different duty truck, among other examples.

As shown in FIG. 1, the dual gas trailer 105 receives compressed gas (e.g., natural gas) at a first site (e.g., a natural gas source 110). The dual gas trailer 105 is transported to a second site (e.g., a hydraulic fracturing site 115, such as a dynamic gas blending (DGB) fracturing site, or a drilling site 120, such as a hybrid gas drilling site, among other examples), where the compressed gas is offloaded. The dual gas trailer 105 receives $CO_2$ (e.g., from a $CO_2$ capture system 125) at the second site. The dual gas trailer 105 is transported to a third site (e.g., a CO2 sequestration site 130, such as a CO2 injection well, among other examples), where the CO2 is offloaded.

As indicated above, FIG. 1 is provided as an example. Other examples may differ from what was described in connection with FIG. 1.

Figure 2:
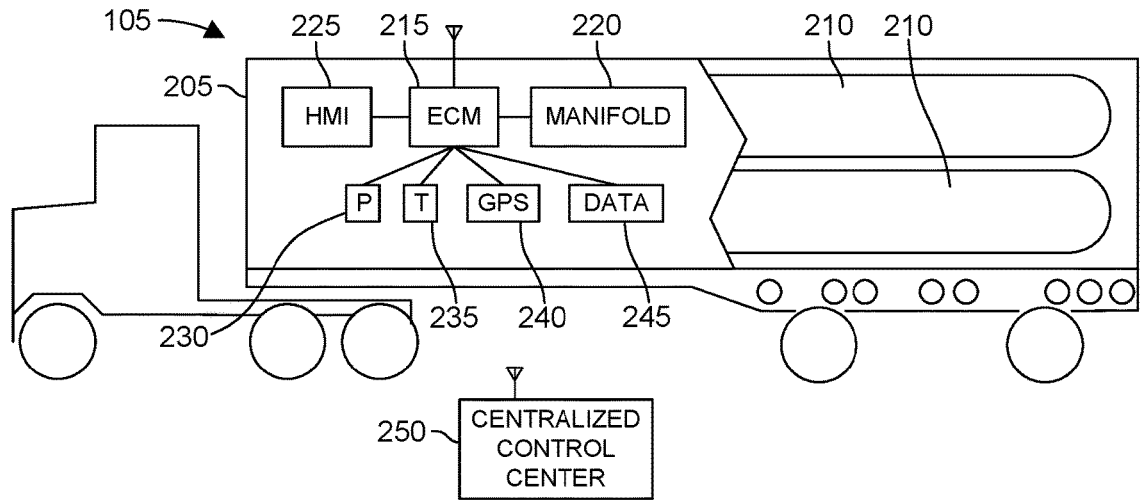
FIG. 2 is a diagram of an example dual gas trailer described herein.

FIG. 2 is a diagram of an example dual gas trailer 105 described herein. In some examples, the dual gas trailer 105 may include less equipment, additional equipment, or alternative equipment compared to the example depicted in FIG. 2.

As shown in FIG. 2, the dual gas trailer 105 includes a frame 205, one or more tanks 210 mounted on the frame 205, an electronic control module 215 (ECM) configured to monitor and/or control operations of the dual gas-trailer 105 (e.g., including the one or more tanks 210) in association (e.g., communication) with a manifold 220, a human machine interface (HMI) 225, one or more pressure sensors 230, one or more temperature sensors 235, a global positioning system (GPS) 240, and a data connection 245.

The frame 205 may be a welded steel frame including a flatbed and a plurality of cross-beam supports.

The one or more tanks 210 may include a plurality of separate tanks (e.g., four tanks). The tanks 210 may be pneumatic tanks configured to hold compressed gas. The tanks 210 may be arranged, from an end-view, in a rectangular (e.g., square) configuration, among other examples.

The ECM 215 may control and/or monitor operations of the dual gas trailer 105. For example, the ECM 215 may control and/or monitor the operations of the dual gas trailer 105 based on information from the manifold 220, HMI 225, pressure sensors 230, temperature sensors 235, GPS 240, data connection 245, or operator controls, among other examples. The ECM 215 may be on-board the dual gas trailer 105. The ECM 215 may be, or include, a controller, among other examples. The ECM 215 may include one or more memories and one or more processors configured to implement instructions to control operations of the dual gas trailer 105. In some examples, the dual gas trailer 105 may be controlled manually (e.g., by performing a manual override of the ECM 215).

The manifold 220 may be mounted on the frame 205. The manifold 220 may include a plurality of separate manifolds (e.g., two manifolds). The manifold 220 may be in fluid communication with internal volumes of each of the tanks 210. The manifold 220 may be configured to distribute gas, from multiple tanks 210 (e.g., simultaneously, individually, or in batches of two or more tanks at the same time). Likewise, the manifold 220 may be configured to gather gas, into multiple tanks 210 (e.g., simultaneously, individually, or in batches of two or more tanks at the same time).

The HMI 225 may be on-board the dual gas trailer 105 for local control and monitoring. Alternatively, the HMI 225, or one or more additional HMI's, may be located remote from the dual gas trailer 105 for remote control and monitoring. In some examples, the HMI 225 may enable remote shutdown of operations of the dual gas trailer 105. The HMI 225 may be, or include, a touchscreen interface, among other examples.

The one or more pressure sensors 230 may be mounted on the tanks 210, and/or on the manifold 220, among other examples. The pressure sensors 230 may be analog or digital pressure transducers configured to measure compressed gas pressures. The pressure sensors 230 may be transmitters.

The one or more temperature sensors 235 may be mounted on the tanks 210, and/or on the manifold 220, among other examples. The temperature sensors 235 may be, or include, a contact or non-contact sensor, resistance temperature detector (RTD), thermocouple sensor, or thermistor, among other examples. The temperature sensors 235 may be configured to measure compressed gas temperatures. The temperature sensors 235 may be transmitters.

The GPS 240 may be on-board the dual gas trailer 105 to provide tracking of the dual gas trailer 105 during transport, as well as during loading and offloading, among other examples. The GPS 240 may be, or include, an assisted GPS, differential GPS, or non-differential GPS, among other examples.

The data connection 245 may include cellular or satellite telemetry communication with a centralized control center 250 located off-board the dual gas trailer 105. The centralized control center 250 may be configured to provide control and data acquisition across a fleet of dual gas trailers 105, simultaneously.

As indicated above, FIG. 2 is provided as an example. Other examples may differ from what was described in connection with FIG. 2.

Figure 3:
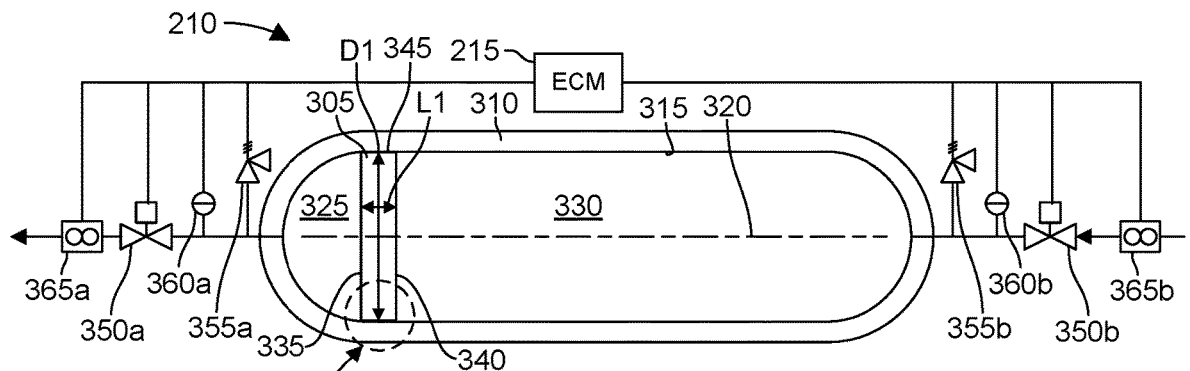
FIG. 3 is a diagram of an example tank described herein, showing a sliding piston in a first position.

FIG. 3 is a diagram of an example tank 210 described herein, showing a sliding piston 305 in a first position. For example, FIG. 3 depicts a sectional view of the tank 210. In some examples, the tank 210 may include less equipment, additional equipment, or alternative equipment compared to the example depicted in FIG. 3.

The tank 210 includes a tank body 310 having an inner cylindrical surface 315, defined about a longitudinal axis 320, being closed at both ends. The tank body 310 includes a first compartment 325 and a second compartment 330. The first compartment 325 and the second compartment 330 are separated from each other by the sliding piston 305 (which may also be referred to as a "floating piston"). The sliding piston 305 includes a cylindrical body having a first end 335 facing the first compartment 325 and a second end 340 facing the second compartment 330. A length L1 of the sliding piston 305 is defined, parallel to the longitudinal axis 320, between the first end 335 and the second end 340. The sliding piston 305 includes an outer surface 345 facing the inner cylindrical surface 315 of the tank body 310. In some examples, the length L1 of the sliding piston 305 may be at least an order of magnitude less than a diameter D1 of the outer surface 345, defined perpendicular to the longitudinal axis 320.

As shown in FIG. 3, the tank 210 may include separate plumbing for the first compartment 325 and the second compartment 330 to prevent cross-contamination between different gases. For example, the first compartment 325, and associated flow lines, may only contain natural gas, whereas the second compartment 330, and associated flow lines, may only contain $CO_2$.

The dual gas trailer 105 includes, in association with the one or more tanks 210 and/or in communication with the ECM 215, one or more flow control valves 350 (350a-b), one or more pressure relief valves 355 (355a-b), one or more indicators 360 (360a-b), and one or more flow meters 365.

The one or more flow control valves 350 may include a first flow control valve 350a, in fluid communication with the first compartment 325, and a second flow control valve 350b, in fluid communication with the second compartment 330. The flow control valves 350 may be gate valves, among other examples. In some examples, the flow control valves 350 may be integrated with the manifold 220. In some examples, one or more additional valves, like the flow control valves 350, may be connected in fluid communication with a field-side of the manifold 220, opposite the one or more tanks 210.

Actuation of each of the one or more flow control valves 350 may controlled independently of each other. For example, the flow control valves 350 may be opened and closed to control filling and emptying each compartment 325/330 independently. In some examples, actuation of the flow control valves 350 may be controlled to manage outlet pressures from each tank 210 and/or each compartment 325/330 individually. Actuation of the flow control valves 350 may be controlled by the ECM 215 (e.g., one or more processors thereof). For example, the ECM 215 may control actuation of the first flow control valve 350a to regulate gas flow into and out of the first compartment 325. Likewise, the ECM 215 may control actuation of the second flow control valve 350b to regulate gas flow into and out of the second compartment 330. In some examples, the ECM 215 may control actuation of the flow control valves 350 based on state information from the manifold 220, operator information from the HMI 225, pressure information from the one or more pressure sensors 230, temperature information from the one or more temperature sensors 235, location information from the GPS 240, and/or operation information from the data connection 245.

The one or more pressure relief valves 355 may include a first pressure relief valve 355a, in fluid communication with the first compartment 325, and a second pressure relief valve 355b, in fluid communication with the second compartment 330. The pressure relief valves 355 may be spring-loaded or pilot operated, among other examples. The pressure relief valves 355 may prevent over-pressurization of the first compartment 325 and/or the second compartment 330.

The one or more indicators 360 (360a-b) may include a first indicator 360a, in fluid communication with the first compartment 325, and a second indicator 360b, in fluid communication with the second compartment 330. The indicators 360 may be, or include, pressure or temperature transducers, or internal or external gas composition sensors (e.g., capacitive electrode sensors), among other examples. In some examples, the indicators 360 may be configured to monitor gas quality within the tanks 210 and/or within one or more gas flow streams into or out of the first compartment 325 and/or the second compartment 330. In some examples, the indicators 360 may be configured to detect gas leaks outside the tanks 210.

The one or more flow meters 365 may include a first flow meter 365a, in fluid communication with the first compartment 325, and a second flow meter 365b, in fluid communication with the second compartment 330. The flow meters 365 may be mass, velocity, differential pressure, or positive displacement, among other examples. The flow meters 365 may be configured to determine gas volumes within the tanks 210 and/or within one or more gas flow streams into or out of the first compartment 325 and/or the second compartment 330.

As indicated above, FIG. 3 is provided as an example. Other examples may differ from what was described in connection with FIG. 3.

Figure 4:
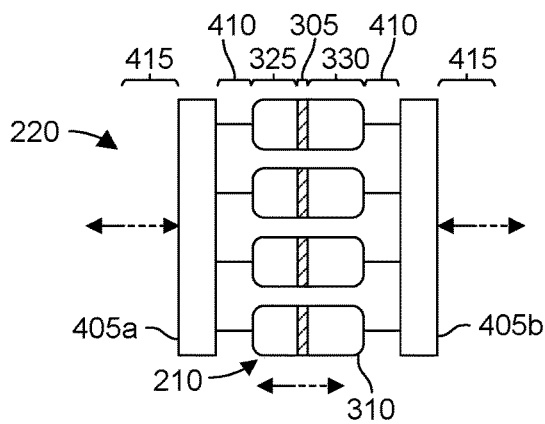
FIG. 4 is a diagram of an example manifold described herein.

FIG. 4 is a diagram of an example manifold 220 described herein. In some examples, the manifold 220 may include less equipment, additional equipment, or alternative equipment compared to the example depicted in FIG. 4.

The manifold 220 includes a body 405 (405a-b) mounted on the dual gas trailer 105. The body 405 includes a first body 405a and a second body 405b. The body 405 may include a different number of parts from what was described in connection with FIG. 4 (e.g., only one part or more than two parts, among other examples). Each body 405 includes a plurality of tank-side ports 410 and at least one field-side port 415. A separate port of the plurality of tank-side ports 410 is in fluid communication with a corresponding tank of the plurality of tanks 210. At least one field-side port 415 is configured to be connected in fluid communication with a gas source (e.g., natural gas or CO2, among other examples).

As shown in FIG. 4, the manifold 220 is configured to combine a first gas from the first compartment 325 of each of the plurality of tanks 210 (e.g., simultaneously) within the first body 405a. The solid arrows indicate that as the first gas from the first compartments 325 is routed through the corresponding tank-side ports 410 (on the left side of FIG. 4), the sliding piston 305 may move in a first direction towards the first compartment end of the tank body 310 (e.g., towards the first position shown in FIG. 3). The solid arrows also indicate that the manifold 220 is further configured to distribute the combined first gas, within the first body 405a, through the field-side port 415 (on the left side of FIG. 4). The solid arrows also indicate that, with the sliding piston 305 in the first position (shown in FIG. 3), the manifold 220 is further configured to gather a second gas, through the field-side port 415 (on the right side of FIG. 4), into the second body 405b. Likewise, the solid arrows also indicate that the second gas gathered into the second body 405b is routed through the tank-side ports 410 (on the right side of FIG. 4) into the corresponding second compartment 330 of each of the plurality of tanks 210 (e.g., simultaneously). In some examples, the sliding piston 305 may move to the first position (shown in FIG. 3) from a second position (shown in FIG. 5), based on filling the second gas into the second compartment 330. In some examples, the dual gas trailer 105 may be used to transport only one gas (e.g., one-way trip, inbound trip only, or outbound trip only, among other examples). Therefore, the sliding piston 305 may not be moved, and/or may not be configured to move, in every implementation.

As indicated by the dashed arrows in FIG. 4, the manifold 220 is further configured to operate in reverse. For example, the manifold 220 is configured to combine the second gas from the second compartment 330 of each of the plurality of tanks 210 (e.g., simultaneously) within the second body 405b. The dashed arrows indicate that as the second gas from the second compartments 330 is routed through the corresponding tank-side ports 410 (on the right side of FIG. 4), the sliding piston 305 may move in a second direction towards the second compartment end of the tank body 310 (e.g., towards a second position shown in FIG. 5). The dashed arrows also indicate that the manifold 220 is further configured to distribute the combined second gas, within the second body 405b, through the field-side port 415 (on the right side of FIG. 4). The dashed arrows also indicate that, with the sliding piston 305 in the second position, the manifold 220 is further configured to gather a third gas (which may be the same as the first gas) (e.g., when the example implementation shown in FIG. 1 is completed, the third gas may represent refilling of the dual gas trailer 105 with natural gas at the natural gas source 110), through the field-side port 415 (on the left side of FIG. 4), into the first body 405a. Likewise, the dashed arrows also indicate that the third gas gathered in the first body 405a is routed through the tank-side ports 410 (on the left side of FIG. 4) into the corresponding first compartment 325 of each of the plurality of tanks 210 (e.g., simultaneously).

As indicated above, FIG. 4 is provided as an example. Other examples may differ from what was described in connection with FIG. 4.

Figure 5:
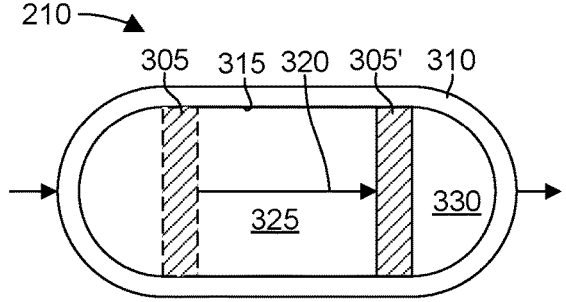
FIG. 5 is a diagram of an example tank described herein, showing the sliding piston in a second position.

FIG. 5 is a diagram of an example tank 210 described herein, showing the sliding piston 305 in a second position (denoted as 305'). For example, FIG. 5 depicts a sectional view of the tank 210. As shown in FIG. 5, the sliding piston 305/305' has moved, from the first position (denoted as 305, shown in dashed lines), parallel to the longitudinal axis 320 towards the second compartment end of the tank body 310, to the second position. In FIG. 5, for sake of clarity, clearance is shown around the longitudinal ends of the sliding piston 305/305' in both the first position and the second position (e.g., between the first end 335 and the first compartment end of the tank body 310 and between the second end 340 and the second compartment end of the tank body). In some examples, the longitudinal ends of the sliding piston 305/305' may be configured not to contact the tank body 310. In other examples, the longitudinal ends may be configured to contact the tank body 310 (e.g., indirect contact). Contact, or lack thereof, between the longitudinal ends of the sliding piston 305/305' and the tank body 310 may be based on certain design and/or operational aspects (e.g., relative shapes of the sliding piston 305/305' and the tank body 310, sliding piston support structures, gas pressures, or differential pressures, among other examples).

As indicated by the arrows, movement of the sliding piston 305/305' to the second position may be associated with emptying gas out of the second compartment 330 and/or filling another gas into the first compartment 325. In some examples, filling and/or emptying operations may occur during movement of the sliding piston 305/305'. In some examples, emptying operations may occur during movement of the sliding piston 305/305', whereas filling operations may occur after movement of the sliding piston 305/305'. In some examples, emptying operations may occur without movement of the sliding piston 305/305', whereas filling operations may occur during movement of the sliding piston 305/305'. In some examples, filling and/or emptying operations may occur before or after movement of the sliding piston 305/305'. In some examples, movement of the sliding piston 305/305' may be based on a differential pressure between the first compartment 325 and the second compartment 330. In some examples, filling and/or emptying of the compartments 325/330 may cause movement of the sliding piston 305/305'. Reversing the process illustrated in FIG. 5, to cause the sliding piston 305 to move from the second position to the first position (e.g., in association with emptying gas out of the first compartment 325 and/or filling another gas into the second compartment 330), may involve any of the operational aspects described herein, without limitation.

As a result of the sliding piston 305 moving to the second position, a volume of the first compartment 325 (in FIG. 5) is greater than a volume of the first compartment 325 (in FIG. 3). Likewise, a volume of the second compartment 330 (in FIG. 5) is less than a volume of the second compartment 330 (in FIG. 3). In some examples, a ratio of the greater volume to the lesser volume may be 10:1 or more (e.g., 100:1 or more).

As indicated above, FIG. 5 is provided as an example. Other examples may differ from what was described in connection with FIG. 5.

Figure 6:
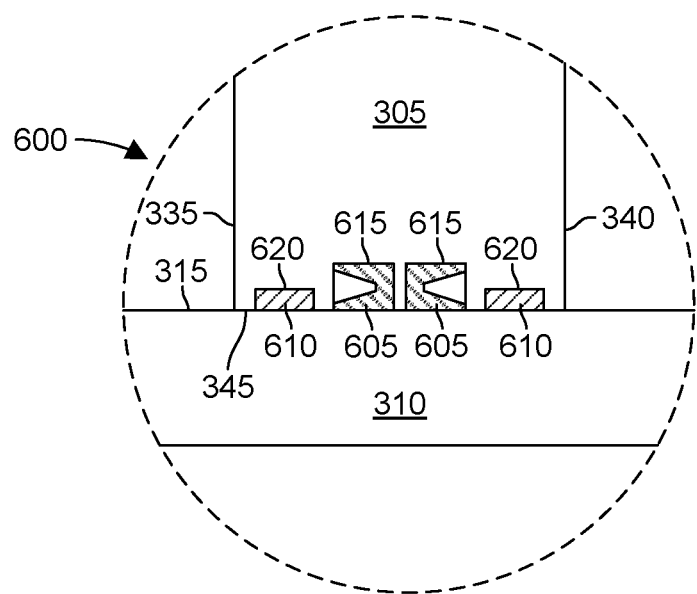
FIG. 6 is a diagram of an example seal assembly described herein.

FIG. 6 is a diagram of an example seal assembly 600 described herein. In some examples, the seal assembly 600 may include less equipment, additional equipment, or alternative equipment compared to the example depicted in FIG. 6.

As shown in FIG. 6, the seal assembly 600 is positioned at an interface radially between the sliding piston 305 and the tank body 310. The seal assembly 600 includes a plurality of annular seals 605 (e.g., rod seals, wiper seals, or buffer seals, among other examples) and a plurality of annular rings 610 (e.g., wear rings or guide rings, among other examples).

The plurality of annular seals 605 may include two or more separate annular seals (e.g., two seals). The annular seals 605 may be in sealing engagement with the inner cylindrical surface 315 of the tank body 310. Each of the annular seals 605 may be disposed in a corresponding annular groove 615 in the outer surface 345 of the sliding piston 305. The annular seals 605 may be spaced apart from each other along the longitudinal axis 320. The annular seals 605 may be oriented, on the longitudinal axis 320, in directions opposite to each other.

Likewise, the plurality of annular rings 610 may include two or more separate annular rings (e.g., two rings). The annular rings 610 may be in engagement with the inner cylindrical surface 315 of the tank body 310. The annular rings 610 may be configured to maintain parallel alignment, along the longitudinal axis 320) between the outer surface 345 of the sliding piston 305 and the inner cylindrical surface 315 of the tank body 310. Each of the annular rings 610 may be disposed in a corresponding annular groove 620 in the outer surface 345 of the sliding piston 305. The annular rings 610 may be spaced apart from each other along the longitudinal axis 320. The annular seals 605 may be positioned longitudinally between the annular rings 610. Alternatively, the positions may be reversed.

As indicated above, FIG. 6 is provided as an example. Other examples may differ from what was described in connection with FIG. 6.

INDUSTRIAL APPLICABILITY

Figure 7:
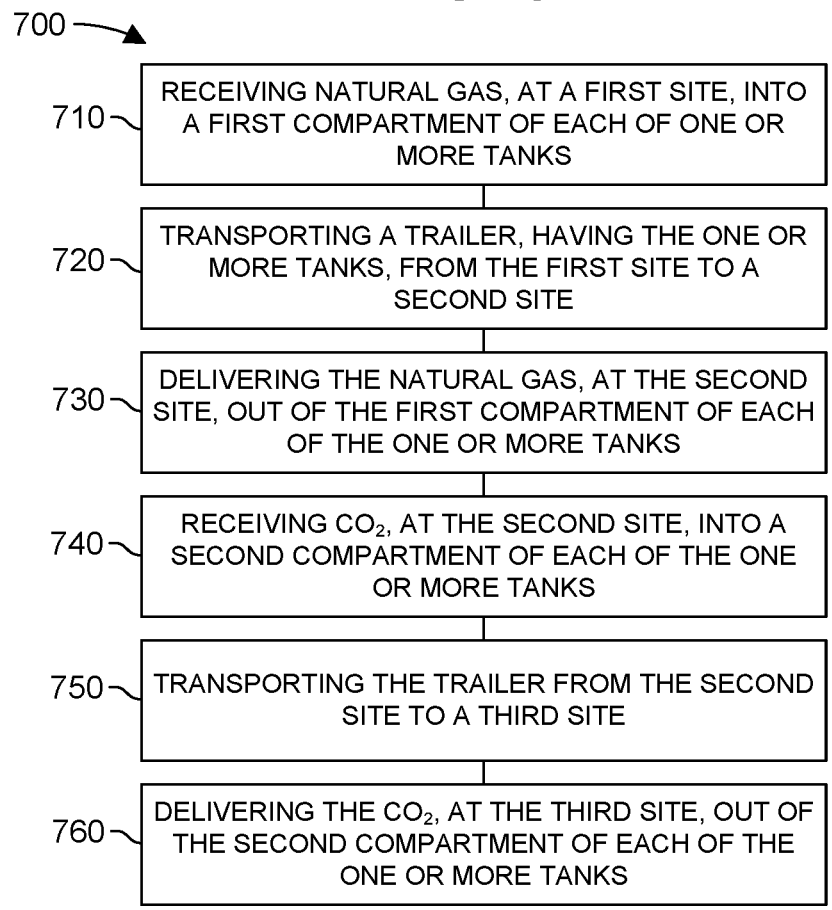
FIG. 7 is a flowchart of an example implementation described herein.

FIG. 7 is a flowchart of an example implementation 700, described herein, that solves one or more of the problems set forth above and/or other problems in the art. At 710, natural gas is received, at a first site 110, into the first compartment 325 of each of the one or more tanks 210. At 720, the dual gas trailer 105, having the one or more tanks 210, is transported from the first site 110 to a second site 115/120. At 730, the natural gas is delivered, at the second site 115/120, out of the first compartment 325 of each of the one or more tanks 210. At 740, $CO_2$ is received, at the second site 115/120, into the second compartment 330 of each of the one or more tanks 210. At 750, the dual gas trailer 105 is transported from the second site 115/120 to a third site 130. At 760, the $CO_2$ is delivered, at the third site 130, out of the second compartment 330 of each of the one or more tanks 210.

As indicated above, FIG. 7 is provided as an example. Other examples may differ from what was described in connection with FIG. 7. For instance, the receiving of the $CO_2$, at 740, may occur at a fourth site that is remote from the second site. In some examples, the first and third sites may be in the same location.

Certain processes and/or equipment associated with oil & gas (e.g., drilling and/or hydraulic fracturing), electric power generation, gas compression, turbines, steam methane reformers, heaters, mining, dryers (e.g., sand drying), agriculture, forestry, asphalt/concrete plants, marine, and/or other industries (e.g., internal combustion engines, such as natural gas engines) may consume fuel (e.g., natural gas) and emit carbon dioxide ($CO_2$). For processes and/or equipment equipped with $CO_2$ capture systems, there is a need for $CO_2$ transport to a remote sequestration site. Currently, transportation of natural gas and $CO_2$ requires separate infrastructure (e.g., tank trailers). Use of separate infrastructure, including devoting at least one leg of each round-trip journey to the return of empty tanks, is inefficient, time-consuming, and costly.

The dual gas trailer 105 solution, and application thereof, described herein, enables use of the same infrastructure for inbound and outbound trips associated with the transport of compressed gas and $CO_2$, which drives efficiency, time savings, and cost savings.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method of dual gas transport with a trailer having one or more tanks, comprising sequentially:
   receiving natural gas, at a first site, into a first compartment of each of the one or more tanks;
   transporting the trailer from the first site to a second site;
   delivering the natural gas, at the second site, out of the first compartment of each of the one or more tanks;
   receiving $CO_2$, at the second site, into a second compartment of each of the one or more tanks;
   transporting the trailer from the second site to a third site; and
   delivering the $CO_2$, at the third site, out of the second compartment of each of the one or more tanks, wherein controlling actuation of one or more valves associated with the first and second compartments is based on location information from a global positioning system on-board the trailer.

2. The method of claim 1,
   wherein the first site includes a natural gas source,
   wherein the second site includes at least one of a hydraulic fracturing site or a drilling site, and
   wherein the third site includes a $CO_2$ injection well.

3. The method of claim 1,
   wherein the one or more tanks include a plurality of tanks,
   wherein the plurality of tanks are in fluid communication with a manifold mounted on the trailer, and
   wherein flow of natural gas and $CO_2$ into and out of each of the one or more tanks is routed through:
   at least one field-side port in a body of the manifold; and
   a plurality of tank-side ports in the body, wherein a separate port of the plurality of tank-side ports is in fluid communication with a corresponding tank of the plurality of tanks.

4. The method of claim 1,
   wherein the trailer includes an electronic control module, and
   wherein flow of natural gas and $CO_2$ into and out of each of the one or more tanks is controlled based on actuation of a first valve, of the one or more valves, in fluid communication with each first compartment and a second valve, of the one or more valves, in fluid communication with each second compartment.

5. The method of claim 2, wherein the second site further includes a $CO_2$ capture system, and wherein receiving the $CO_2$ at the second site further includes receiving the $CO_2$ from the $CO_2$ capture system.

6. The method of claim 1, wherein receiving the natural gas at a first site further includes controlling actuation of a first valve, of the one or more valves, in fluid communication with the first compartment of each of the one or more tanks, to receive the natural gas into the first compartment of each of the one or more tanks.

7. The method of claim 6, wherein delivering the natural gas at the second site further includes controlling actuation of the first valve to deliver the natural gas out of the first compartment of each of the one or more tanks.

8. The method of claim 1, wherein receiving $CO_2$ at the second site further includes controlling actuation of a second valve, of the one or more valves, in fluid communication with a second compartment of each of the one or more tanks, to receive the $CO_2$ into the second compartment of each of the one or more tanks.

9. The method of claim 8, wherein delivering the $CO_2$ at the third site further includes controlling actuation of the second valve to deliver the $CO_2$ out of the second compartment of each of the one or more tanks.

10. The method of claim 1, wherein controlling actuation of the one or more valves associated with the first and second compartments for is further based on operation information from a data connection associated with the dual gas transport system.

11. The method of claim 1, wherein controlling actuation of the one or more valves associated with the first and second compartments is further based on at least one of:
    pressure information from one or more pressure sensors associated with the one or more tanks, or
    temperature information from one or more temperature sensors associated with the one or more tanks.

12. A method of dual gas transport with a trailer having one or more tanks, comprising sequentially:
    receiving natural gas, at a first site, into a first compartment of each of the one or more tanks;
    transporting the trailer from the first site to a second site;
    delivering the natural gas, at the second site, out of the first compartment of each of the one or more tanks; and
    receiving $CO_2$, at the second site, into a second compartment of each of the one or more tanks, wherein controlling actuation of one or more valves associated with the first and second compartments is based on location information from a global positioning system on-board the trailer.

13. The method of claim 12,
    wherein the first site includes a natural gas source, and
    wherein the second site includes at least one of a hydraulic fracturing site or a drilling site.

14. The method of claim 13, wherein the second site further includes a $CO_2$ capture system, and wherein receiving the $CO_2$ at the second site further includes receiving the $CO_2$ from the $CO_2$ capture system.

15. The method of claim 12, wherein controlling actuation of the one or more valves associated with the first and second compartments is further based on pressure information from one or more pressure sensors associated with the one or more tanks.

16. A method of dual gas transport with a trailer having one or more tanks, comprising sequentially:
   delivering natural gas, at a first site, out of a first compartment of each of the one or more tanks;
   receiving $CO_2$, at the first site, into a second compartment of each of the one or more tanks;
   transporting the trailer from the first site to a second site; and
   delivering the $CO_2$, at the second site, out of the second compartment of each of the one or more tanks, wherein controlling actuation of one or more valves associated with the first and second compartments is based on location information from a global positioning system on-board the trailer.

17. The method of claim 16,
   wherein the first site includes at least one of a hydraulic fracturing site or a drilling site, and
   wherein the second site includes a $CO_2$ injection well.

18. The method of claim 17, wherein the first site further includes a $CO_2$ capture system, and wherein receiving the $CO_2$ at the first site further includes receiving the $CO_2$ from the $CO_2$ capture system.

19. The method of claim 16, wherein controlling actuation of the one or more valves associated with the first and second compartments is further based on pressure information from one or more pressure sensors associated with the one or more tanks.

* * * * *